US 8,209,706 B2

(12) United States Patent
Corvera et al.

(10) Patent No.: US 8,209,706 B2
(45) Date of Patent: Jun. 26, 2012

(54) INTER-FRAME MESSAGING BETWEEN DIFFERENT DOMAINS

(75) Inventors: Gabriel Corvera, Redmond, WA (US); George Moore, Issaquah, WA (US); Daniel Thorpe, Santa Cruz, CA (US); Koji Kato, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1030 days.

(21) Appl. No.: 12/147,661

(22) Filed: Jun. 27, 2008

(65) Prior Publication Data

US 2009/0328063 A1    Dec. 31, 2009

(51) Int. Cl.
*G06F 9/44* (2006.01)
*G06F 3/00* (2006.01)
*G06F 17/00* (2006.01)

(52) U.S. Cl. ........ 719/315; 719/316; 715/240; 715/234; 715/738

(58) Field of Classification Search .................. 719/310, 719/315, 316; 715/240, 234, 738
See application file for complete search history.

(56) References Cited

U.S. PATENT DOCUMENTS

| | | | | |
|---|---|---|---|---|
| 6,567,918 | B1 * | 5/2003 | Flynn et al. | 726/7 |
| 6,816,880 | B1 | 11/2004 | Strandberg et al. | |
| 6,865,599 | B2 * | 3/2005 | Zhang | 709/218 |
| 7,093,279 | B2 * | 8/2006 | Tretheway et al. | 726/3 |
| 7,200,818 | B2 * | 4/2007 | Becker et al. | 715/804 |
| 7,302,402 | B2 | 11/2007 | Callaghan et al. | |
| 7,328,435 | B2 * | 2/2008 | Trifon | 717/171 |
| 8,024,400 | B2 * | 9/2011 | Lin et al. | 709/203 |
| 2004/0210536 | A1 | 10/2004 | Gudelj et al. | |
| 2005/0055458 | A1 | 3/2005 | Mohan et al. | |
| 2006/0190619 | A1 | 8/2006 | Tenembaum et al. | |
| 2007/0101258 | A1 | 5/2007 | Xu et al. | |
| 2007/0113237 | A1 | 5/2007 | Hickson | |
| 2007/0299735 | A1 | 12/2007 | Mangalick et al. | |
| 2007/0299857 | A1 | 12/2007 | Gwozdz et al. | |
| 2007/0300064 | A1 | 12/2007 | Isaacs et al. | |
| 2008/0313648 | A1 * | 12/2008 | Wang et al. | 719/315 |

OTHER PUBLICATIONS

Bhola, et al., "Security for Web2.0 Application Scenarios: Exposures, Issues and Challenges", 2007, 2 pages.
Microsoft Corp., Microsoft Inter Frame Messaging XMLHttp API, retrieved Apr. 24, 2008 from http://msdn2.microsoft.com/en-us/library/cc305118(printer).aspx.

(Continued)

*Primary Examiner* — Van Nguyen
(74) *Attorney, Agent, or Firm* — Lyon & Harr, LLP; Richard T. Lyon

(57) ABSTRACT

Cross-domain communication between a parent web page hosted in a parent domain and a child web page hosted in a different child domain is provided. Upon downloading the parent page and child page into a client's web browser, an IFM-channel connection can be established within the browser between the parent page and child page, which can be used to bidirectionally communicate text-based messages containing commands and HTML content directly between the parent page and child page. Additionally, an XML-channel connection can be established within the browser between the parent page and child page, which can be used to bidirectionally communicate text-based messages containing HTTP commands and XML content directly between the parent page and child page. This cross-domain communication of messages takes place completely within the browser.

20 Claims, 7 Drawing Sheets

OTHER PUBLICATIONS

Yahoo! Inc., JavaScript: Use a web proxy for cross-domain XMLHttpRequest Calls, retrieved Apr. 24, 2008 from http://www.yahooapis.com/javascript/howto-proxy.html.

Zabir, O. A., Fast, scalable, streaming AJAX proxy—Continuously deliver data from cross domain, The Code Project, Apr. 13, 2008, http://www.codeproject/com/KB/ajax/ajaxproxy.asx.

Hickson, I., Public-Webapi, (XMLHttpRequest2) Second proposal for cross-site extensions to XMLHttpRequest, Apr. 17, 2006, http://www.mail-archive.com/public-webapi@w3.org/msg00341.html.

Hickson, I., (XMLHttpRequest2) Third proposal for cross-site extensions to XMLHttpRequest, Jun. 6, 2006, http://lists.w3.org/Archives/Public/public-webapi/2006Jun/0012.html.

Kesteren, A. V., Anne Van Kesteren: Weblog 4.2, retrieved Apr. 24, 2008 from http://annevankesteren.nl/2007/02/xxx.

Thorpe, D., Secure cross-domain communication in the browser, The Architecture Journal, retrieved Dec. 30, 2008 from http://msdn.microsoft.com/en-us/library/bb735305(printer).aspx.

* cited by examiner

INTER-FRAME MESSAGING BETWEEN DIFFERENT DOMAINS

BACKGROUND

Web pages are an information resource which can be accessed by a user via a web browser which executes on a client computing device. Each web page is generally hosted on a website server computing device. Web pages are generally defined and stored in either hypertext markup language (HTML) or extensible hypertext markup language (XHTML) format. A user can make a client request to view a particular web page via the client's web browser. Based on this request, the corresponding website server will download the requested web page to the client's browser which will render and display the web page to the user in the browser's display sector. A web page can provide the user with the ability to navigate to other web pages via embedded navigation elements such as hypertext links. Web pages can either be static or dynamic. A static web page consists of static content which is stored directly within the website server's file system. As such, a static web page always contains the same content in response to all client requests for the web page. In contrast, a dynamic web page is constructed "on the fly" by the website server each time the server receives a client request for the web page. As such, a dynamic web page contains content which can vary based on the context and/or conditions that exist at the time a particular client request for the web page is received by the website server. Client-based scripting and server-based scripting are two popular methods for generating dynamic web pages.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Inter-frame messaging (IFM) technique embodiments described herein generally provide for cross-domain communication between a parent web page which is hosted in a parent domain and a child web page which is hosted in a different child domain, where this cross domain communication takes place completely within the web browser of a client computing device. In one exemplary embodiment the parent web page can embed HTML content from the child web page. Upon downloading the parent web page into the browser, an IFM-frame object containing a parent instantiation of a channel-control object can be constructed within the parent web page. Upon downloading the child web page into the browser, an IFM-channel object containing a child instantiation of the channel-control object can be constructed within the browser. An IFM-channel connection can then be established between the parent instantiation of the channel-control object and the child instantiation of the channel-control object. Then, the established IFM-channel connection can be used to bidirectionally communicate text-based messages containing commands and HTML content directly between the parent web page and the child web page. In another exemplary embodiment, the parent web page can embed XML content from the child web page. Upon downloading the parent web page into the browser, an IFM-frame object containing an IFM-XMLHTTP-request object can be constructed within the parent web page. Upon downloading the child web page into the browser, an IFM-channel object containing an IFM-XM-LHTTP-proxy object can be constructed within the browser. An XML-channel connection between the IFM-XMLHTTP-request object and the IFM-XMLHTTP-proxy object can then be used to bidirectionally communicate text-based messages containing HTTP commands and XML content directly between the parent web page and the child web page.

As will be appreciated from the detailed description of the IFM technique embodiments which follows, since the communication of messages between a web page hosted in one domain and another web page hosted in a different domain takes place completely within the client's web browser without having to first transmit the messages to a server, the IFM technique embodiments described herein provide improved communication throughput compared to conventional iframe uniform resource locator (URL) techniques for communicating between different domains. Additionally, by reducing server traffic, the IFM technique embodiments improve server performance and preserve network bandwidth. Furthermore, since the IFM technique embodiments described herein allow iframes in different domains to communicate with each other in a reliable, secure and controlled manner within the client's web browser, the IFM technique embodiments enable web pages from various web sites to interact with one another, thus enabling new web page mashup scenarios.

In addition to the just described benefits, other advantages of the IFM technique embodiments described herein will become apparent from the detailed description which follows hereafter when taken in conjunction with the drawing figures which accompany the detailed description.

DESCRIPTION OF THE DRAWINGS

The specific features, aspects, and advantages of the inter-frame messaging (IFM) technique embodiments described herein will become better understood with regard to the following description, appended claims, and accompanying drawings where:

DETAILED DESCRIPTION

Figure 1:
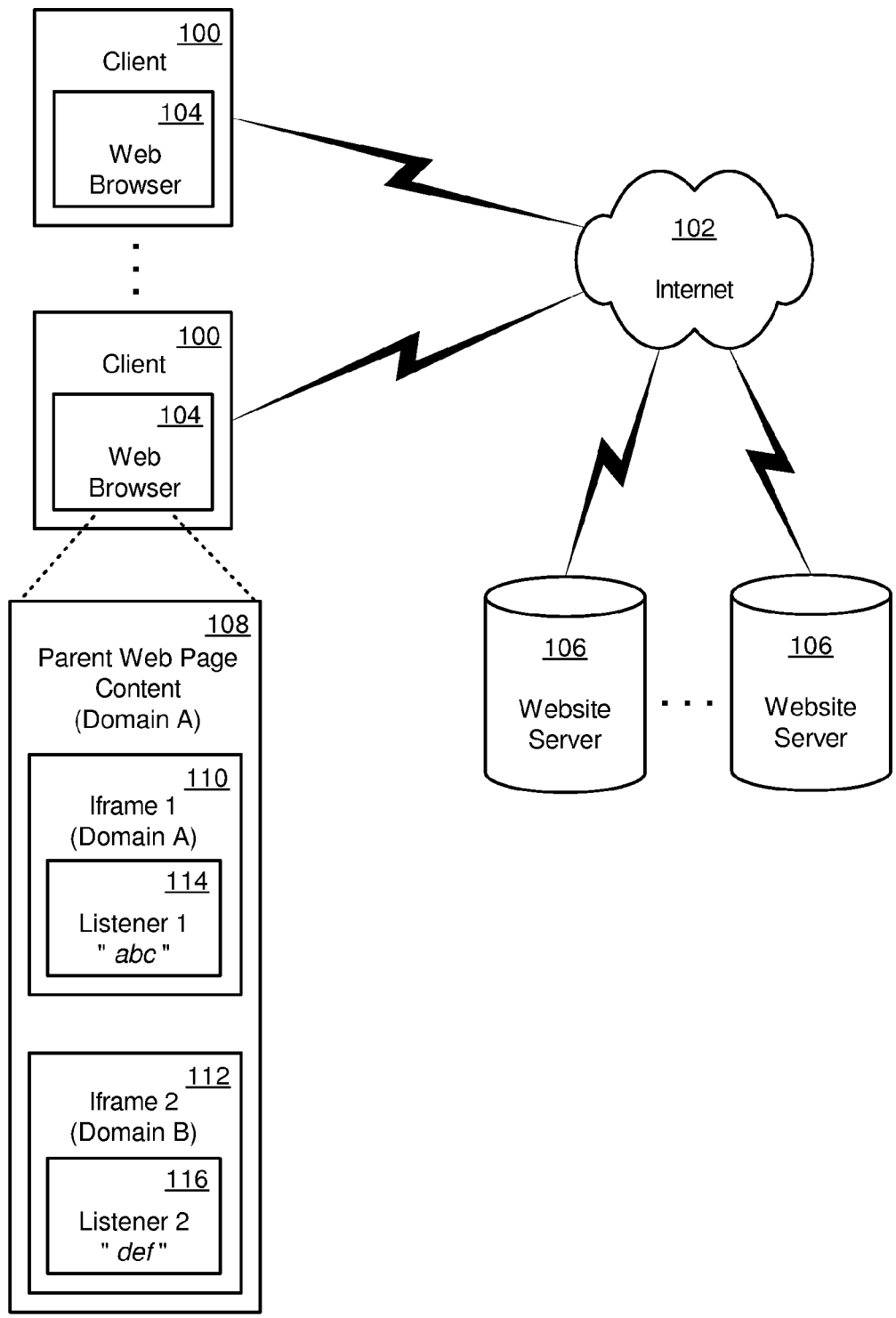
FIG. 1 illustrates a diagram of an exemplary embodiment, in simplified form, of a computing and network system which constitutes an exemplary environment for implementing the IFM technique embodiments described herein.

In the following description of inter-frame messaging (IFM) technique embodiments reference is made to the accompanying drawings which form a part hereof, and in which are shown, by way of illustration, specific embodiments in which the IFM technique can be practiced. It is understood that other embodiments can be utilized and structural changes can be made without departing from the scope of the IFM technique embodiments. The term "display sector" is used herein to refer to a segmented region of a computer display device (such as a monitor among other things) in which a particular type of user operation is performed or a particular type of information (such as a hypertext markup language (HTML) document or extensible hypertext markup language (XHTML) document, among other things) and/or graphical user interface is displayed. The term "domain" is used herein to refer to an Internet domain. As is appreciated in the art of object-oriented programming, the term "class" is used herein to refer to a set of metadata which generally describes the rules by which an "object" behaves. A particular object is constructed from a particular class, where the constructed object is typically capable of receiving messages from other objects, processing information, and sending messages to other objects. The messages can include both commands and web page content. It should be noted that although the IFM technique embodiments are described herein in relation to the Internet, the IFM technique embodiments are also operational on private intranets which use the public Internet computing systems and networks to offer a select group of private applications to a restricted group of users, as well as on any other collection of computing systems and networks not associated with the Internet.

1.0 Communication Between Different Domains

As is appreciated in the art of computer networking and the Internet, today's web browsers are designed to prevent one web page which is hosted on a website server computing device residing in one domain from directly communicating with or executing a script on another web page which is hosted on another website server computing device residing in another domain. In other words, today's web browsers isolate web pages that are hosted on website servers which reside in different domains from one another. A primary reason for this domain isolation pertains to security. This domain isolation didn't cause problems in the early days of the Internet since the software applications for most web pages were located in a central website server as opposed to being located within a client computing device's web browser. In the rare cases where software applications for a particular web page were located within the client, the applications typically only accessed content from a single website server which resided in the same domain as the client. Thus, in the early days of the Internet website servers generally operated in a self-contained manner and contained only HTML links to content located elsewhere.

Web page software applications have evolved since the early days of the Internet. Today a typical web page aggregates (i.e., embeds) content from other web pages which are hosted in different domains. This aggregation is driven by a number of different factors including the fact that a web page which employs such aggregation (hereafter referred to as a "parent web page") can increase its value by allowing its users to access other web pages which are hosted in a diverse collection of other domains (hereafter referred to as "child web pages") without having to leave the parent web page's domain. This aggregation thus requires communication between different domains.

As is appreciated in the art of computer networking and the Internet, an inline frame (iframe) is an HTML element which is supported by many popular web browsers. Iframes make it possible to embed content from one or more "child" web pages inside a "parent" web page. The parent web page's content is rendered and displayed to a user within the web browser's display sector, and each embedded child web page's content is presented to the user within a different sub-sector of the browser's display sector. Each sub-sector typically displays either a selectable link to the child web page's content, or the actual content of the child web page.

While "regular" frames are typically used to divide the entire browser display sector into sub-sectors, one or more iframes can be employed a web page in order to display independent content to a user in much the same way as images which are embedded in a web page are typically displayed to a user. In other words, the browser allocates space for each iframe which is taken into account when the parent web page's content is rendered and displayed to the user. Therefore, when the user scrolls the content of the parent web page in the display sector each iframe scrolls along with it, similar to an embedded image. Furthermore, while regular frames are typically used to logically subdivide different types of content being displayed to a user from a common web page, iframes can be used to display content from other web pages (such as advertisements, current financial markets information, news bulletins and the like) which is located across the network on other website servers. Additionally, iframes operate independently within the browser. For example, the size of each iframe can be independently specified. The content of the parent web page can also be displayed to the user while the content of each embedded child web page is being downloaded. Iframes can also optionally contain their own vertical and/or horizontal scroll bars which operate independently of any scroll bars which exist in the browser's display sector. The following is a general overview of how iframes operate in the context of the IFM technique embodiments described herein.

FIG. 1 illustrates a diagram of an exemplary embodiment, in simplified form, of a computing and network system which constitutes an exemplary environment for implementing the IFM technique embodiments described herein. As depicted in FIG. 1, a plurality of clients 100 are connected to a communications network such as the Internet 102. Generally speaking, each client 100 is configured with a variety of different software applications including a web browser 104. Each web browser 104 is configured to communicate with one or more website servers 106 each of which hosts one or more web pages. Via the browser 104, a user can request a particular parent web page and the client 100 will then transmit the request over the network 102 to the particular website server 106 containing the parent web page. This website server 106 will then retrieve the parent web page and download it over the network 102 to the requesting client 100. Upon receiving the parent web page from the website server 106, the client's 100 browser 104 will render and display the content of the parent web page 108 to the user in the browser's display sector.

Referring again to FIG. 1, assuming one or more iframes are employed within the content of the parent web page 108, where each iframe embeds content from a child web page, the web browser 104 will process, render and display the iframes as follows. By way of example but not limitation, the content of the parent web page 108 depicted in FIG. 1 includes two different iframes, iframe 1 110 and iframe 2 112. It is assumed that the parent web page 108 is hosted in a domain A, iframe 1 110 is also hosted in domain A, and iframe 2 112 is hosted in another domain B. In an alternate web page embodiment (not shown) a single iframe can be employed in the parent web page. In this case the single iframe can be used to embed a child web page hosted either in the same domain as its parent web page, or in a different domain than its parent web page. In another alternate web page embodiment (not shown) more than two iframes can be employed in the parent web page. In this case each of the iframes can be independently used to embed child web pages hosted either in the same domain as their parent web page, or in different domains than their parent web page. By way of example but not limitation, in an exemplary web page embodiment employing three iframes (not shown) where the parent web page is hosted in a domain A, the first iframe can embed a first child web page hosted in another domain B, the second iframe can embed a second child web page hosted in yet another domain C, and the third iframe can embed a third child web page hosted in yet another domain D.

Referring again to FIG. 1, iframe 1 110 includes a listener 1 iframe 114 which shares the same domain as iframe 1. Correspondingly, iframe 2 112 includes a listener 2 iframe 116 which shares the same domain as iframe 2. Listener 1 114 and listener 2 116 can be considered to be "nested iframes." When the content of the parent web page 108 is received by the client's 100 web browser 104, the browser first creates iframe 1 110 in its own domain (domain A) and provides iframe 1 with a name to be used for listener 1 114. It is noted that any suitable name can be used for listener 1 114. In the exemplary embodiment depicted in FIG. 1, listener 1's 114 name is "abc" which represents a private hash. Iframe 1 110 then creates the listener 1 iframe 114 in its domain using the private hash abc as its name. As is appreciated in the art of iframes, listener 1 114 is associated with a uniform resource locator (URL) address which is used by other web pages who want to communicate with the parent web page 108. In other words, listener 1 114 serves as a message receiver for messages intended for the parent web page 108. Listener 1 114 also serves as a target display sub-sector for content from other web pages intended for the parent web page 108.

Referring again to FIG. 1, the browser 104 also creates iframe 2 112 in a different domain (domain B) and provides iframe 2 with a name to be used for listener 2 116. It is noted that any suitable name can be used for listener 2 116. In the exemplary embodiment depicted in FIG. 1, listener 2's 116 name is "def" which represents another private hash. Iframe 2 112 then creates the listener 2 iframe 116 in its domain using the private hash def as its name. Listener 2 116 is associated with another URL address which is used by other web pages who want to communicate with iframe 2 112. In other words, listener 2 116 serves as a message receiver for messages intended for iframe 2 112. Listener 2 116 also serves as a target display sub-sector for content from other web pages intended for iframe 2 112. If communication is desired between iframe 1 110 and iframe 2 112, the web browser would also provide iframe 1 with the name of the listener 2 iframe 116 (i.e. def) and would provide iframe 2 with the name of the listener 1 iframe 114 (i.e. abc).

Referring again to FIG. 1, it is noted that since the nested listener 1 and listener 2 iframes 114/116 share the same domain as an iframe 110/112 (or web page) with which communication is desired, the web browser's aforementioned domain isolation does not present a barrier to communication between the "domain-matched" iframes (and/or web pages). Thus, iframes can be employed within a web page to enable communication between different domains.

2.0 Inter-Frame Messaging Between Different Domains

Generally speaking, the IFM technique embodiments described herein provide methods which allow a web page in one domain to communicate directly with another web page in a different domain in a reliable, secure and controlled manner. More particularly, the IFM technique embodiments described herein include two simple, easy to use application programming interfaces (APIs), an IFM API and an IFM extensible markup language hypertext transfer protocol (XMLHTTP) API. Both the IFM API and IFM XMLHTTP API employ a special kind of iframe (referred to herein as an IFM-frame object) which establishes a client-based channel for communicating messages (which can include both commands and web page content) between a parent web page which is hosted on a website server residing in a parent domain and a child web page which is hosted on another website server residing in a different child domain. It is noted that both the IFM API and IFM XMLHTTP API enable this cross-domain communication to take place completely within the client's web browser. In other words, the messages are communicated directly between the parent web page and the child web page in the browser, rather than having to first be transmitted from the client to a website server. In tested embodiments of the IFM technique embodiments described herein, Apple Safari version 3.0, Mozilla Firefox version 2.0 and version 3.0, and Microsoft Internet Explorer® (a registered trademark of Microsoft Corporation) version 6 and version 7, were employed for the web browser.

2.1 IFM API

This section provides a detailed description of exemplary embodiments of the IFM API which can be employed within the client in order to enable bidirectional communication of text-based messages containing commands and HTML content (among other things) directly between a parent web page which is hosted on a website server residing in a parent domain and a child web page which is hosted on another website server residing in a different child domain, where this cross-domain bidirectional communication takes place completely within the client's web browser. The IFM API contains an IFM library which provides for an IFM-frame class and an IFM-channel class which are used to establish an IFM-channel connection between the parent web page and the child web page. In tested embodiments of the IFM API described herein an IFM-frame object and IFM-channel object were constructed from these classes using a declarative markup style. The declarative markup style of constructing HTML objects is well suited for static web page development initiatives. It is both simple and expressive, and is also more intuitive than a functional object constructor in light of the fact that the IFM API embodiments described herein are based on the creation of iframes. It also reduces the complexity of using an API in the HTML environment. More particularly, the declarative markup style of object construction employs custom HTML element tags and/or custom attributes to specify control parameters using name/value pairs. The declarative markup style of object construction also scans the domain of a web page during its download in order to discover tags that need to have objects constructed. However, it is noted that the declarative markup style of object construction is not as well suited to dynamic web page development initiatives which require that the IFM API be constructed on the fly. For these situations an alternate embodiment of the IFM API is possible in which the IFM-frame object and IFM-channel object can be constructed using a functional object constructor such as a conventional JavaScript object constructor.

Figure 2:
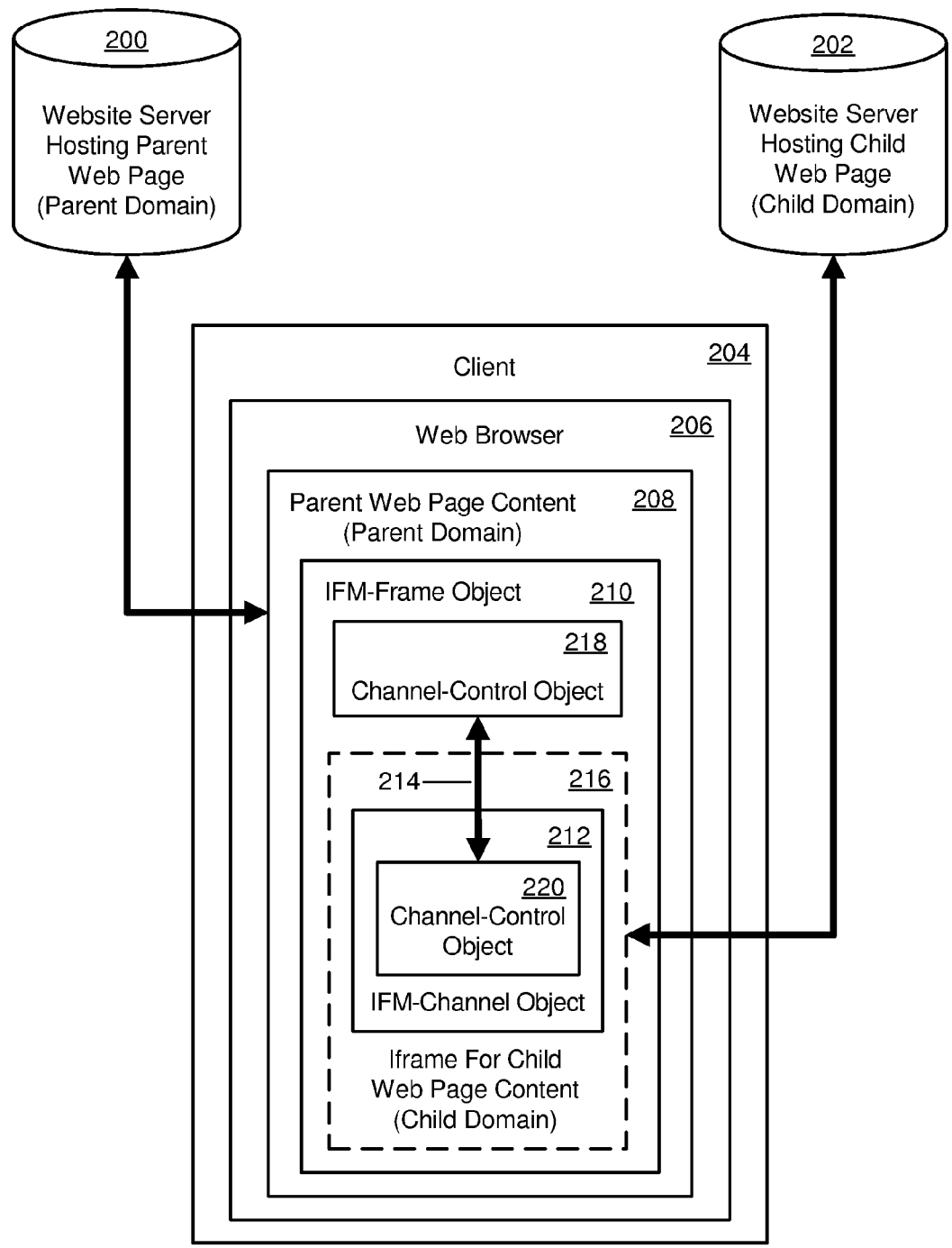
FIG. 2 illustrates a diagram of an exemplary embodiment, in simplified form, of an IFM framework for communicating text-based messages containing commands and HTML content between two different web pages which are hosted in two different domains.

FIG. 2 illustrates a diagram of an exemplary embodiment, in simplified form, of an IFM framework for bidirectionally communicating text-based messages containing commands and HTML content (among other things) directly between two different web pages which are hosted in two different domains. As depicted in FIG. 2, a parent web page is hosted on a website server residing in a parent domain 200 and a child web page is hosted on another website server residing in a different child domain 202. It is assumed that both the parent web page 200 and child web page 202 employ the IFM API described in detail herein. It is also assumed that the parent web page 200 is an outermost containing web page which embeds HTML content from the child web page 202. As such, when a user at a client 204 requests the parent web page 200 via the client's web browser 206, the browser must also communicate with the child web page 202 in order to download its HTML content, thus requiring communication between the parent and child domains. The following is a description of how the IFM API enables this cross-domain communication completely within the client's 204 web browser 206.

Generally speaking and referring again to FIG. 2, when the parent web page is retrieved from its website server 200 and downloaded into the client's 204 web browser 206, the browser will render and display the parent web page to the user in the following manner. The browser 206 will render and display the content of the parent web page 208 in the browser's display sector. The browser 206 will also construct an IFM-frame object 210 within the page 208. The IFM-frame object 210 contains an iframe 216 which hosts the child web page 202. It is noted that the iframe 216 serves as a placeholder for the HTML content of the child web page until this content is successfully downloaded from the website server 202 which hosts the child web page, upon which the child web page's HTML content will be embedded inside of the iframe. The IFM-frame object 210 also contains a channel-control object 218 which is used to send text-based messages to, and receive text-based messages from, the child web page 202.

Referring again to FIG. 2, when the child web page is retrieved from its website server 202 and downloaded into the client's 204 web browser 206, the browser will construct an IFM-channel object 212 within the browser. The IFM-channel object 212 contains another instantiation of the channel-control object 220 which serves as a communication end point to which an IFM-channel connection 214 can be established from the IFM-frame object 210. This instantiation of the channel-control object 220 is used to receive text-based messages from, and send text-based messages to, the parent web page 208. Generally speaking, a web page which employs the IFM-channel object 212 can be assumed to be a child web page which is hosted in the IFM-frame object 210 of one or more parent web pages. A single script file in the IFM library can be used to construct the IFM-frame object 210 and IFM-channel object 212, where this script file is not dependent on any other script files, libraries or framework, and it exposes only the IFM API and nothing more. In tested embodiments of the IFM API, a JavaScript file was employed for this script file. It is noted that alternate embodiments of the IFM API are also possible which employ other types of script files such as a Microsoft Visual Basic® (a registered trademark of Microsoft Corporation) script file and the like.

Referring again to FIG. 2, the channel-control object 218 for the parent web page 208 can send a message to the channel-control object 220 for the child web page requesting to establish an IFM-channel connection 214 there-between. The channel-control object 220 will receive the IFM-channel connection request message and processes the request as follows. The channel-control object 220 can contain an allowed-domains parameter which specifies the parent domain(s) that are sanctioned (i.e., trusted) by the child web page 202. This parameter can specify a select set of parent domains which are sanctioned, or, it can specify that either no parent domains are sanctioned or all possible parent domains are sanctioned. The channel-control object 220 compares the parent domain that the IFM-channel connection request originated from against the allowed-domains parameter. If this parameter specifies that the request originated from a sanctioned parent domain, the channel-control object 220 will accept the request and establish an IFM-channel connection 214 to the channel-control object 218 that sent the request. If the allowed-domains parameter specifies that the request originated from an unsanctioned parent domain, the channel-control object 220 will reject the request and prevent the IFM-channel connection 214 from being established, thus preventing the parent web page 208 from accessing the child web page 202.

Referring again to FIG. 2, once the IFM-channel connection 214 is established between the channel-control object 218 of the parent web page 208 and the channel-control object 220 of the child web page 202, this connection can be used to exchange a unique pair of cryptographically strong random numbers between the parent and child web pages in order to enhance the security of the IFM-channel connection. Each instance of an IFM-channel connection 214 would have its own unique pair of numbers. This pair of numbers serves as IFM-session keys which, in combination with the Domain Name System (DNS) name entity, serves to enhance the security of the IFM-channel connection 214 by protecting it against spoofing and replay attacks. If the parent web page 208 receives a message over the IFM-channel connection 214 from the child web page 202 and this message contains the child web page's key, the parent web page can be reasonably assured that the message actually came from the child web page. It is noted that these keys are not used to encrypt information passing through the IFM-channel connection 214; rather, they are "canary" values which are used to prove the origin of the information. In tested embodiments of the IFM API a specialized, central random number generating web service (not shown) was employed to supply the random numbers to the parent and child web pages in response to asynchronous requests for such from the IFM-frame object 210 and IFM-channel object 212. It is noted that alternate embodiments of the IFM API are also possibly which employ other suitable sources for cryptographically strong random numbers, where these sources can be either server-based or client-based.

Referring again to FIG. 2, once the IFM-channel connection 214 is established between the channel-control object 218 of the parent web page 208 and the channel-control object 220 of the child web page 202, these channel-control objects 218/220 can generally be used to bidirectionally communicate text-based messages containing commands and HTML content (among other things) across the IFM-channel connection 214 directly between the parent and child web pages, where this cross-domain communication takes place completely within the client's 204 web browser 206. By way of example but not limitation, HTML content from the child web page 202 can be downloaded over the IFM-channel connection 214, and subsequently rendered and displayed to the user in the iframe 216. It is noted that some messages which are received from the child web page 202 may not be rendered and displayed, but rather may be processed by the client 204 in a variety of other ways such as being forwarded to the parent web page's website server 200. It is also noted that the child web page is a relatively passive participant in the IFM API embodiments described herein. While the child web page can specify which parent domain(s) it will accept IFM-channel connections from, beyond that it must wait to receive an IFM-channel connection request from a particular parent web page.

Referring again to FIG. 2, the IFM-frame object 210 and IFM-channel object 212 can contain a transport-speed parameter which specifies the throughput of the IFM-channel connection 214. In tested embodiments of the IFM API, the transport-speed parameter specified two metrics for the IFM-channel connection 214 throughput, slow and fast. When a slow throughput is specified for a particular IFM-channel connection 214, the channel-control object 218 of the parent web page 208 and the channel-control object 220 of the child web page 202 will "chunk" messages which are larger than a prescribed size into a series of smaller messages before they are transmitted across the IFM-channel connection 214. When a chunked series of smaller messages is received on the other end of the IFM-channel connection 214, the receiving channel-control object 218/220 will reassemble the chunked series of smaller messages before they are delivered to the client's 204 web browser 206. Thus, the IFM API embodiments described herein are not performance limited by any URL size limitations imposed by the web browser 206.

Referring again to FIG. 2, whenever Adobe Flash application plug-in software is installed in the client's 204 web browser 206, Adobe Flash's LocalConnection object can be employed for the channel-control object 218/220. In the event that Adobe Flash application plug-in software is not installed in the client's 204 web browser 206, an alternate channel-control object 218/220 can be constructed via a script file in the IFM library, which can be the single script file that was described heretofore. It is noted that alternate embodiments of the IFM API are also possible which employ other types of cross-domain communication plug-in software for the browser 206 such as Microsoft Silverlight™ (a trademark of Microsoft Corporation).

Figure 4:
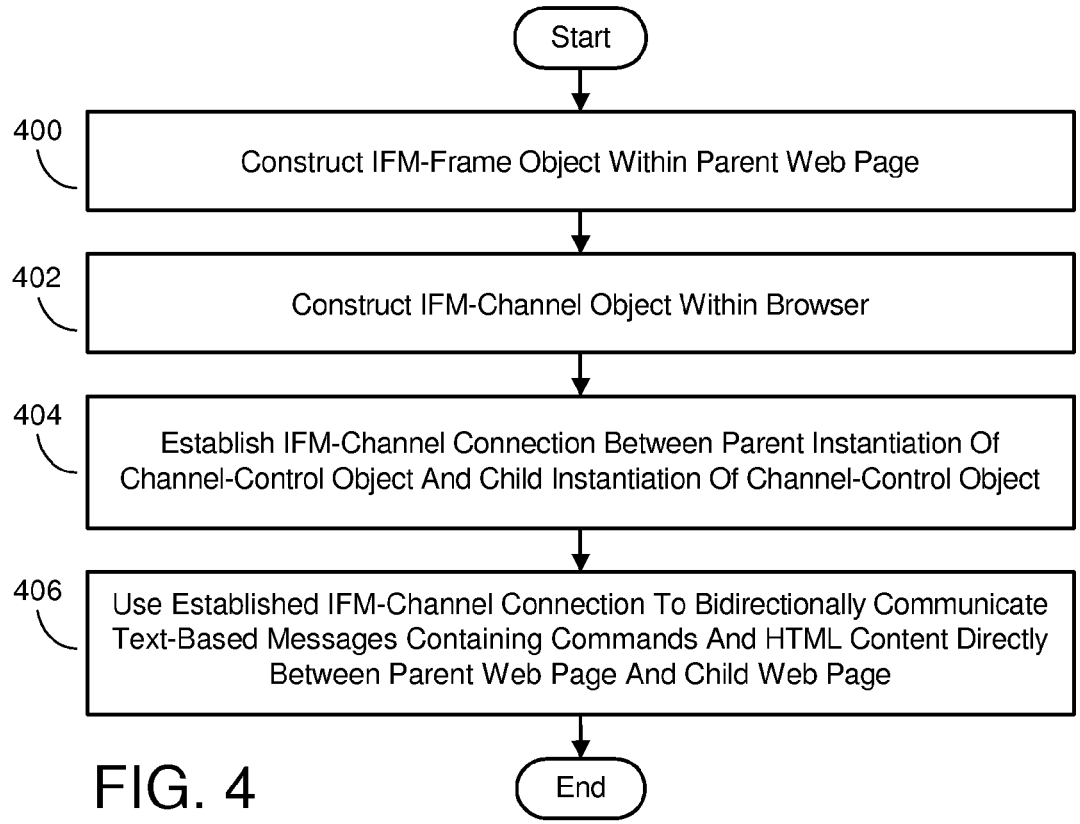
FIG. 4 illustrates a flow diagram of an exemplary embodiment, in simplified form, of a process for communicating text-based messages containing commands and HTML content between two different web pages which are hosted in two different domains.

FIG. 4 illustrates a flow diagram of an exemplary embodiment, in simplified form, of a process for cross-domain communication of text-based messages containing commands and HTML content (among other things) between a parent web page which is hosted in a parent domain and a child web page which is hosted in a different child domain, where this cross domain communication takes place completely within the web browser of a client computing device. As exemplified in FIG. 4, upon downloading the parent web page into the browser, the process starts with the construction of an IFM-frame object within the parent web page 400, where the IFM-frame object contains a parent instantiation of a channel-control object. Upon downloading the child web page into the browser, an IFM-channel object is then constructed within the browser 402, where the IFM-channel object contains a child instantiation of the channel-control object. Then, an IFM-channel connection is established between the parent instantiation of the channel-control object and the child instantiation of the channel-control object 404. Finally, the established IFM-channel connection is used to bidirectionally communicate text-based messages containing commands and HTML content (among other things) directly between the parent web page and the child web page 406.

Figure 5:
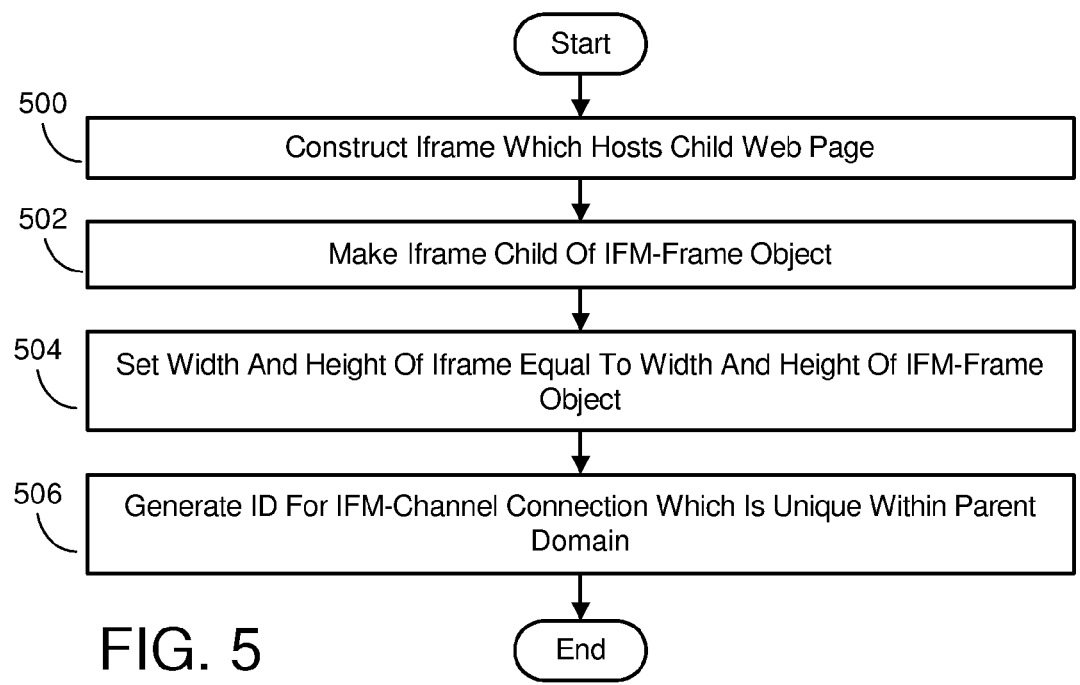
FIG. 5 illustrates a flow diagram of an exemplary embodiment, in simplified form, of a process for constructing an IFM-frame object within a parent web page.

FIG. 5 illustrates a flow diagram of an exemplary embodiment, in simplified form, of a process for constructing the IFM-frame object within the parent web page. As exemplified in FIG. 5, the process starts with constructing an iframe which hosts the child web page 500. The iframe is then made a child of the IFM-frame object 502. The width and height of the iframe are then set equal to the width and height of the IFM-frame object 504. Finally, an ID is generated for the IFM-channel connection between the parent web page and the child web page, where the ID is unique within the parent domain 506.

Figure 8:
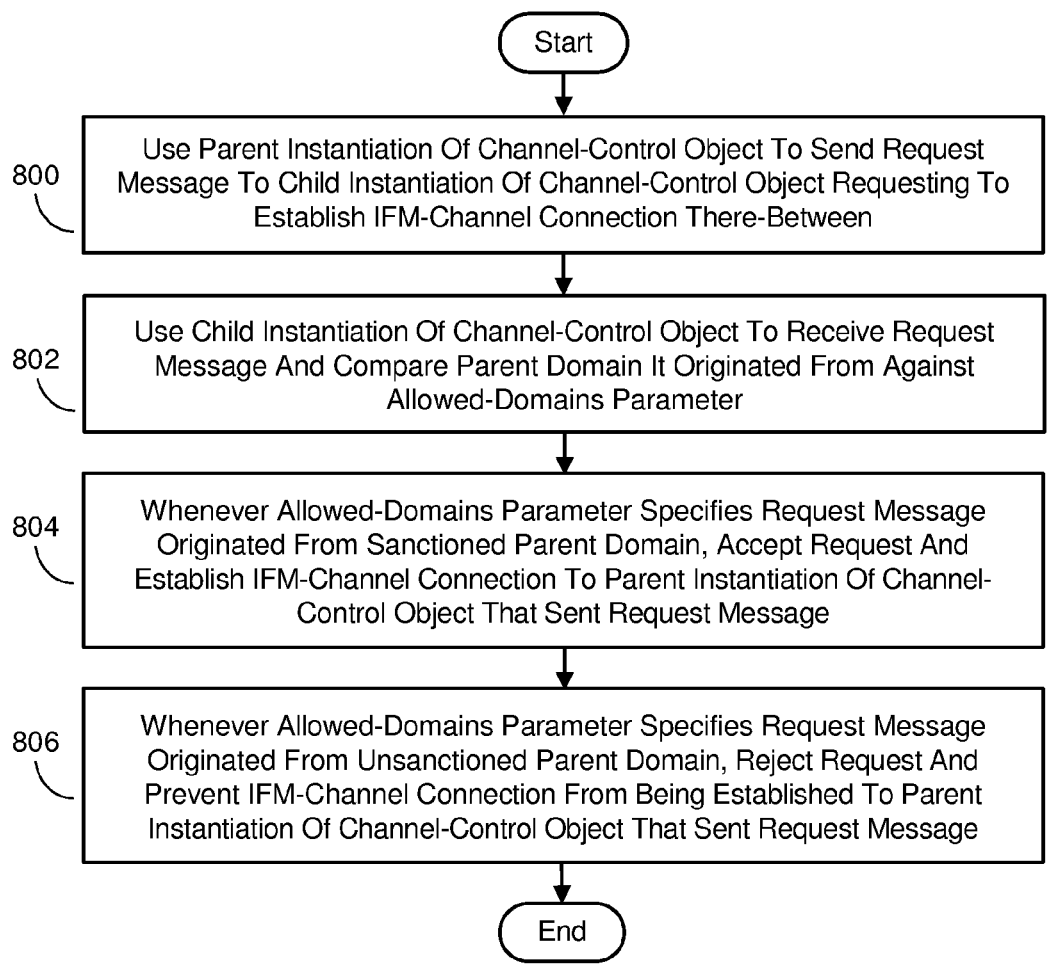
FIG. 8 illustrates a flow diagram of an exemplary embodiment, in simplified form, of a process for establishing an IFM-channel connection between a parent instantiation of a channel-control object and a child instantiation of the channel-control object.

FIG. 8 illustrates a flow diagram of an exemplary embodiment, in simplified form, of a process for establishing the IFM-channel connection between the parent instantiation of the channel-control object and the child instantiation of the channel-control object. As exemplified in FIG. 8, the process starts with using the parent instantiation of the channel-control object to send a request message to the child instantiation of the channel-control object requesting to establish an IFM-channel connection there-between 800. The child instantiation of the channel-control object is then used to receive the request message and compare the parent domain it originated from against the allowed-domains parameter 802. Whenever the allowed-domains parameter specifies that the request message originated from a sanctioned parent domain, the child instantiation of the channel-control object will accept the request and establish the IFM-channel connection to the parent instantiation of the channel-control object that sent the request message 804. Whenever the allowed domains parameter specifies that the request message originated from an unsanctioned parent domain, the child instantiation of the channel-control object will reject the request and prevent the IFM-channel connection from being established to the parent instantiation of the channel-control object that sent the request message 806.

2.2 IFM XMLHTTP API

This section provides a detailed description of exemplary embodiments of the IFM XMLHTTP API which can be employed within the client, on top of the IFM API described heretofore, in order to enable bidirectional communication of text-based messages containing hypertext transfer protocol (HTTP) commands and extensible markup language (XML) content (among other things) directly between a parent web page which is hosted on a website server residing in a parent domain and a child web page which is hosted on another website server residing in a different child domain using a conventional HTTP protocol, where this cross-domain bidirectional communication takes place completely within the client's web browser. The IFM XMLHTTP API adds an IFM-XMLHTTP-request class and an IFM-XMLHTTP-proxy class to the aforementioned IFM library, which are used to establish an XML-channel connection between the parent web page and the child web page. In tested embodiments of the IFM XMLHTTP API described herein, an IFM-XMLHTTP-request object and an IFM-XMLHTTP-proxy object were constructed from these classes using the aforementioned declarative markup style, which as described heretofore is well suited for static web page development initiatives. However, as also described heretofore, for dynamic web page development initiatives which require that the IFM XMLHTTP API be constructed on the fly, an alternate embodiment of the IFM XMLHTTP API is possible in which the IFM-XMLHTTP-request object and an IFM-XMLHTTP-proxy object can be constructed using the aforementioned functional object constructor.

Figure 3:
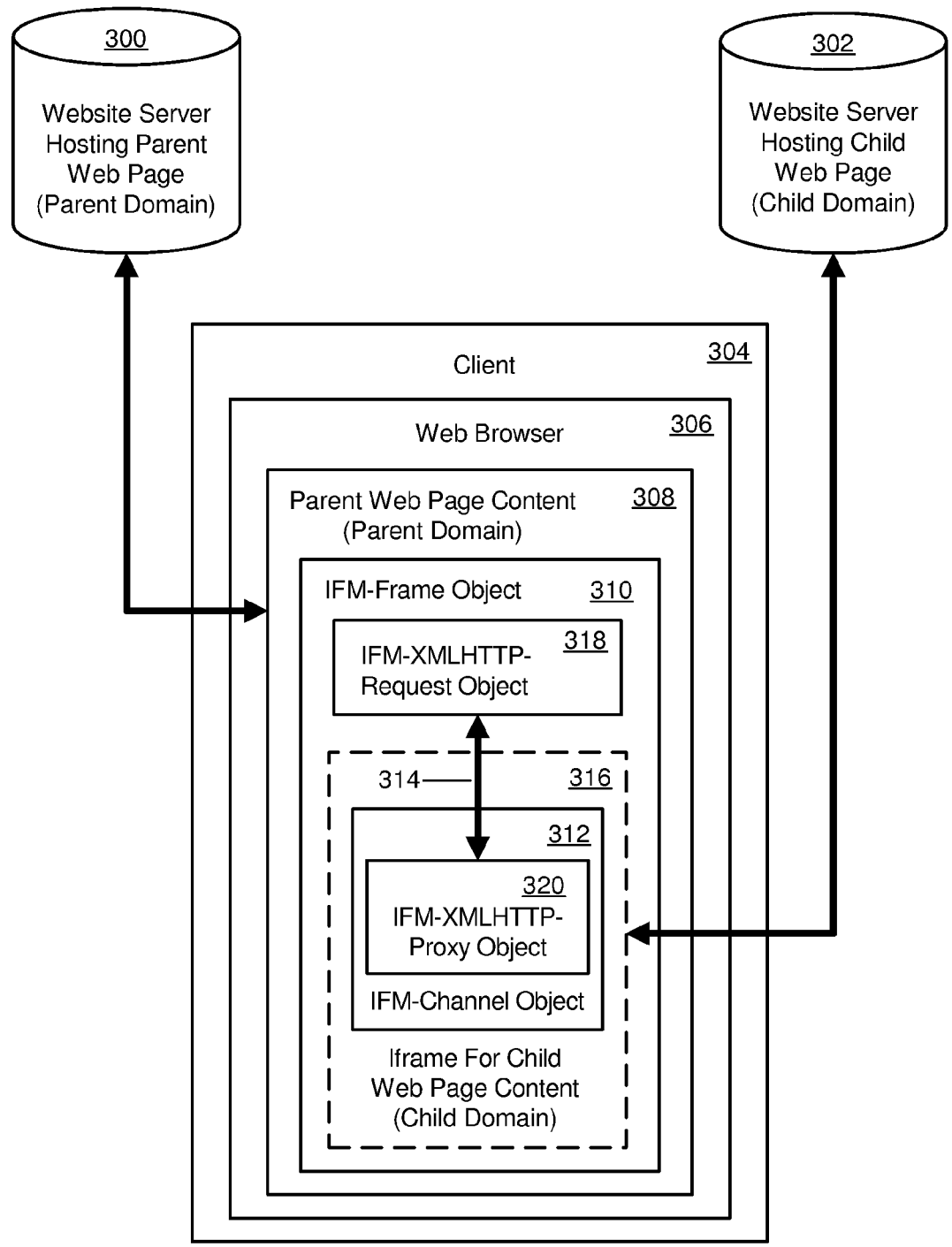
FIG. 3 illustrates a diagram of an exemplary embodiment, in simplified form, of an IFM framework for communicating text-based messages containing HTTP commands and XML content between two different web pages which are hosted in two different domains.

FIG. 3 illustrates a diagram of an exemplary embodiment, in simplified form, of an IFM framework for bidirectionally communicating text-based messages containing HTTP commands and XML content (among other things) directly between two different web pages which are hosted in two different domains. As depicted in FIG. 3, a parent web page is hosted on a website server residing in a parent domain 300 and a child web page is hosted on another website server residing in a different child domain 302. It is assumed that both the parent web page 300 and child web page 302 employ the IFM XMLHTTP API described in detail herein. It is also assumed that the parent web page 300 is an outermost containing web page which embeds XML content from the child web page 302. As such, when a user at a client 304 requests the parent web page 300 via the client's web browser 306, the browser must also communicate with the child web page 302 in order to download its XML content, thus requiring communication between the parent and child domains. The following is a description of how the IFM XMLHTTP API enables this cross-domain communication completely within the client's 304 web browser 306.

Generally speaking and referring again to FIG. 3, when the parent web page is retrieved from its website server 300 and downloaded into the client's 304 web browser 306, the browser will render and display the parent web page to the user in the following manner. The browser 306 will render and display the content of the parent web page 308 in the browser's display sector. The browser 306 will also construct an IFM-frame object 310 within the page 308. The IFM-frame object 310 contains an iframe 316 which hosts the child web page 302. It is noted that the iframe 316 serves as a placeholder for the XML content of the child web page until this content is successfully downloaded from the website server 302 which hosts the child web page, upon which the child web page's XML content will be embedded inside of the iframe. The IFM-frame object 310 also contains an IFM-XMLHTTP-request object 318 (hereafter simply referred to as a "request object") which is used to send text-based messages to, and receive text-based messages from, the child web page 302.

Referring again to FIG. 3, when the child web page is retrieved from its website server 302 and downloaded into the client's 304 web browser 306, the browser will construct an IFM-channel object 312 within the browser. The IFM-channel object 312 contains an IFM-XMLHTTP-proxy object 320 (hereafter simply referred to as a "proxy object") which serves as a communication end point which receives text-based messages from, and sends text-based messages to, the IFM-frame object 310 across an XML-channel connection 314.

Referring again to FIG. 3, the request object 318 for the parent web page 308 can send an IFM-XMLHTTP-request message to the proxy object 320 for the child web page 302. This request message generally includes one or more HTTP headers, an HTTP verb, a URL path and a text-based message body which can contain XML content among other things. Generally speaking, a variety of different types of HTTP headers can be employed for the IFM-XMLHTTP-request message. More particularly, the types of HTTP headers that can be employed are defined by the types of HTTP headers that are supported by the particular proxy object 320 for the particular child web page 302. In tested embodiments of the IFM XMLHTTP API the following types of HTTP headers were employed. A content-type HTTP header specified a content-type associated with the IFM-XMLHTTP-request message, where this content-type could be either plain format XML content or Atom format XML content. An authentication HTTP header contained a declaration token which was used to authenticate the request message.

Referring again to FIG. 3, the proxy object 320 will receive the IFM-XMLHTTP-request message and process it as follows. Generally speaking, the proxy object 320 can filter the request messages it receives based on various filter criteria. For received request messages which pass its filter criteria, the proxy object 320 can pass these request messages to the website server 302 which hosts the child web page. For received request messages which do not pass its filter criteria, the proxy object 320 can block these request messages, thus preventing the parent web page 308 from accessing the child web page 302. In one embodiment of the IFM XMLHTTP API the proxy object 320 can employ an allowed-domains parameter as its filter criteria, where this parameter specifies the parent domain(s) that are sanctioned (i.e., trusted) by the child web page 302. The allowed-domains parameter can specify a select set of parent domains which are sanctioned, or, it can specify that either no parent domains are sanctioned or all possible parent domains are sanctioned. The proxy object 320 can compare the parent domain that the request message originated from against the allowed-domains parameter. If this parameter specifies that the request message originated from a sanctioned parent domain, the proxy object 320 will pass the request message to the website server 302 which hosts the child web page. If the allowed-domains parameter specifies that the request message originated from an unsanctioned parent domain, the proxy object 320 will block the message. In another embodiment of the IFM XMLHTTP API the proxy object 320 can employ an allowed-verbs parameter as its filter criteria, where this parameter specifies the types of HTTP verbs that are sanctioned by the child web page 302. The allowed-verbs parameter can specify a select set of HTTP verbs which are sanctioned, or, it can specify that either no HTTP verbs are sanctioned or all possible HTTP verbs are sanctioned. In yet another embodiment of the IFM XMLHTTP API the proxy object 320 can employ an allowed-paths parameter as its filter criteria, where this parameter specifies the URL paths that are sanctioned by the child web page 302. The allowed-paths parameter can specify a select set of URL paths which are sanctioned, or, it can specify that either no URL paths are sanctioned or all possible URL paths are sanctioned. It is noted that yet other embodiments of the IFM XMLHTTP API are also possible which employ various combinations of the aforementioned different filter criteria.

Referring again to FIG. 3, the IFM-XMLHTTP-request message that is sent from the request object 318 to the proxy object 320 can request that the child web page 302 perform a variety of different types operations. By way of example but not limitation, this request message can either request XML content from the child web page 302, or it can include XML content in its text-based message body which is to be sent to the child web page. In the case where this request message requests XML content from the child web page 302, once the proxy object 320 receives a response message containing the requested XML content from the child web page's website server 302, the proxy object will pass the received XML content to the web browser 306 for rendering and display in the iframe 316. It is noted that some messages which are received from the child web page 302 may not be rendered and displayed, but rather may be processed by the client 304 in a variety of other ways such as being forwarded to the parent web page's website server 300.

Figure 6:
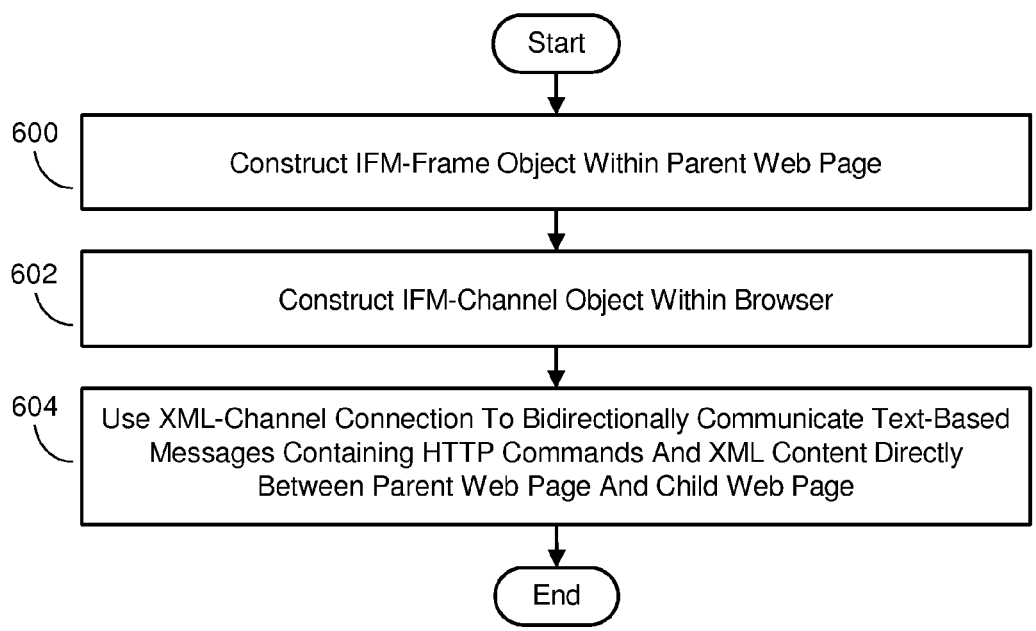
FIG. 6 illustrates a flow diagram of an exemplary embodiment, in simplified form, of a process for communicating text-based messages containing HTTP commands and XML content between two different web pages which are hosted in two different domains.

FIG. 6 illustrates a flow diagram of an exemplary embodiment, in simplified form, of a process for cross-domain communication of text-based messages containing HTTP commands and XML content (among other things) between a parent web page which is hosted on a website server residing in a parent domain and a child web page which is hosted on another website server residing in a different child domain, where this cross domain communication takes place completely within the web browser of a client computing device. As exemplified in FIG. 6, upon downloading the parent web page into the browser, the process starts with the construction of an IFM-frame object within the parent web page 600, where the IFM-frame object contains an IFM-XMLHTTP-request object. Upon downloading the child web page into the browser, an IFM-channel object is then constructed within the browser 602, where the IFM-channel object contains an IFM-XMLHTTP-proxy object. Finally, an XML-channel connection between the IFM-XMLHTTP-request object and the IFM-XMLHTTP-proxy object is used to bidirectionally communicate text-based messages containing HTTP commands and XML content (among other things) directly between the parent web page and the child web page 604.

3.0 Additional Embodiments

While the IFM technique has been described in detail by specific reference to embodiments thereof, it is understood that variations and modifications thereof can be made without departing from the true spirit and scope of the IFM technique. By way of example but not limitation, although FIGS. 2 and 3 illustrate exemplary embodiments of an IFM framework in which the parent web page embeds content from a single child web page, another embodiment (not shown) of the IFM technique described herein is possible in which the parent web page embeds content from a plurality of child web pages which are hosted on website servers residing in a plurality of different child domains. In this IFM technique embodiment, a separate IFM-frame object can be constructed within the parent web page for each child web page, a separate IFM-channel object can be constructed within the browser for each child web page, and a separate IFM-channel connection or XML-channel connection can be established there-between in the manner described heretofore. In other words, a plurality of independent IFM-channel connections or XML-channel connections can be established within the browser.

It is also noted that any or all of the aforementioned embodiments can be used in any combination desired to form additional hybrid embodiments. Although the IFM technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

4.0 Computing Environment

This section provides a brief, general description of a suitable computing system environment in which portions of the IFM technique embodiments described herein can be implemented. These IFM technique embodiments are operational with numerous general purpose or special purpose computing system environments or configurations. Exemplary well known computing systems, environments, and/or configurations that can be suitable include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the aforementioned systems or devices, and the like.

Figure 7:
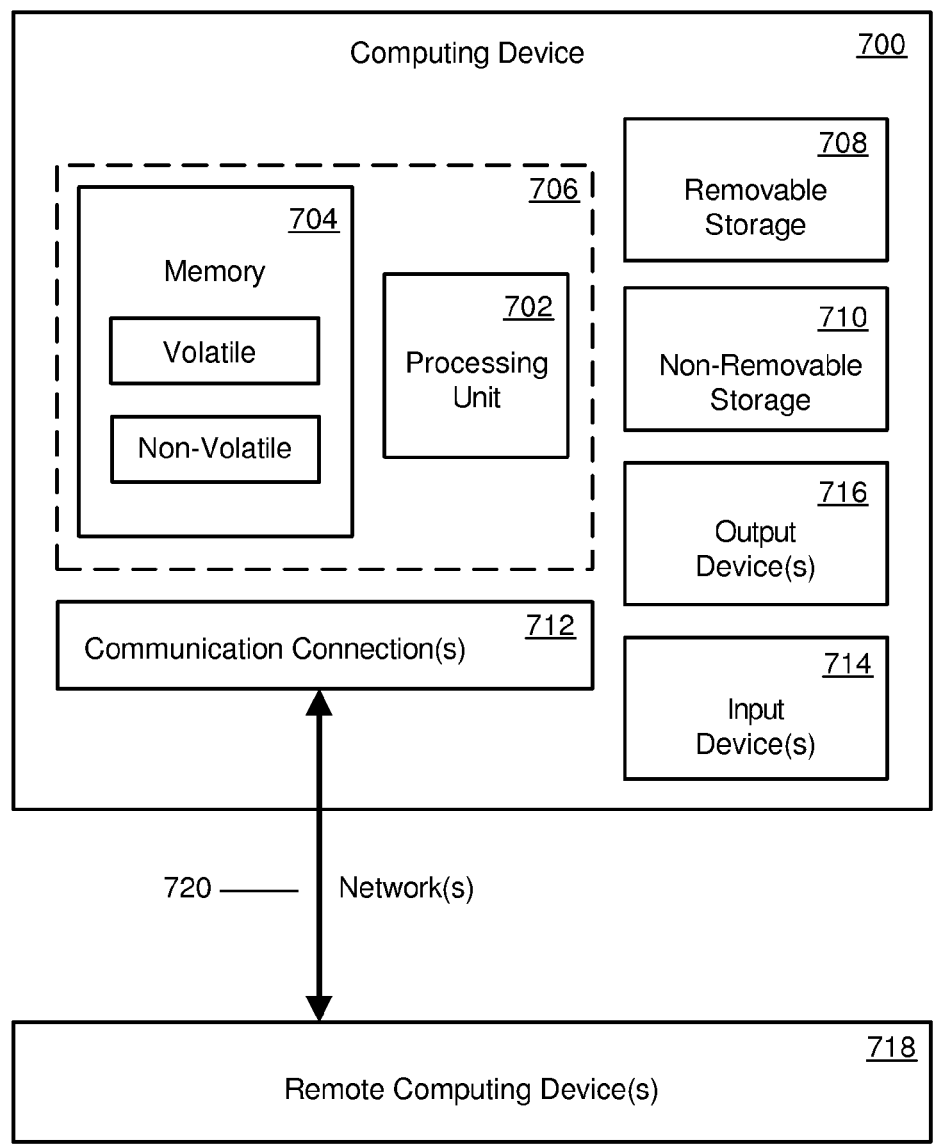
FIG. 7 illustrates a diagram of an exemplary embodiment, in simplified form, of a general purpose, network-based computing device which constitutes an exemplary system for implementing the IFM technique embodiments described herein.

FIG. 7 illustrates a diagram of an exemplary embodiment, in simplified form, of a suitable computing system environment according to the IFM technique embodiments described herein. The environment illustrated in FIG. 7 is only one example of a suitable computing system environment and is not intended to suggest any limitation as to the scope of use or functionality of the IFM technique embodiments described herein. Neither should the computing system environment be interpreted as having any dependency or requirement relating to any one or combination of components exemplified in FIG. 7.

As exemplified in FIG. 7, an exemplary system for implementing the IFM technique embodiments described herein includes one or more computing devices, such as computing device 700. In its simplest configuration, computing device 700 typically includes at least one processing unit 702 and memory 704. Depending on the specific configuration and type of computing device, the memory 704 can be volatile (such as RAM), non-volatile (such as ROM and flash memory, among others) or some combination of the two. This simplest configuration is illustrated by dashed line 706.

As exemplified in FIG. 7, computing device 700 can also have additional features and functionality. By way of example, computing device 700 can include additional storage such as removable storage 708 and/or non-removable storage 710. This additional storage includes, but is not limited to, magnetic disks, optical disks and tape. Computer storage media typically embodies volatile and non-volatile media, as well as removable and non-removable media implemented in any method or technology. The computer storage media provides for storage of various information required to operate the device 700 such as computer readable instructions associated with an operating system, application programs and other program modules, and data structures, among other things. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical disk storage technology, magnetic cassettes, magnetic tape, magnetic disk storage or other magnetic storage devices, or any other medium which can be used to store the desired information and which can be accessed by computing device 700. Any such computer storage media can be part of computing device 700.

As exemplified in FIG. 7, computing device 700 also includes a communications connection(s) 712 that allows the device to operate in a networked environment and communicate with a remote computing device(s), such as remote computing device(s) 718. Remote computing device(s) 718 can be a PC, a server, a router, a peer device, or other common network node, and typically includes many or all of the elements described herein relative to computing device 700. Communication between computing devices takes place over a network(s) 720, which provides a logical connection(s) between the computing devices. The logical connection(s) can include one or more different types of networks including, but not limited to, a local area network(s) (LAN) and wide area network(s) (WAN). Such networking environments are commonplace in conventional offices, enterprise-wide computer networks, intranets and the Internet. It will be appreciated that the communications connection(s) 712 and related network(s) 720 described herein are exemplary and other means of establishing communication between the computing devices can be used.

As exemplified in FIG. 7, communications connection(s) 712 and related network(s) 720 are an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, radio frequency (RF), infrared, frequency modulation (FM) radio and other wireless media. The term "computer-readable medium" as used herein includes both the aforementioned storage media and communication media.

As exemplified in FIG. 7, computing device 700 also includes an input device(s) 714 and output device(s) 716. Exemplary input devices 714 include, but are not limited to, a keyboard, mouse, pen, touch input device, microphone, and camera, among others. A user can enter commands and various types of information into the computing device 700 through the input device(s) 714. Exemplary output devices 716 include, but are not limited to, a display device(s), a printer, and audio output devices, among others. These input and output devices are well known and need not be described at length here.

Referring again to FIG. 7, the IFM technique embodiments described herein can be further described in the general context of computer-executable instructions, such as program modules, which are executed by computing device 700. Generally, program modules include routines, programs, objects, components, and data structures, among other things, that perform particular tasks or implement particular abstract data types. The IFM technique embodiments can also be practiced in a distributed computing environment where tasks are performed by one or more remote computing devices 718 that are linked through a communications network 712/720. In a distributed computing environment, program modules can be located in both local and remote computer storage media including, but not limited to, memory 704 and storage devices 708/710.

Wherefore, what is claimed is:

1. In a system comprising a parent web page which is hosted in a parent domain, a child web page which is hosted in a different child domain, and a client computing device comprising a web browser, wherein the parent web page embeds hypertext markup language (HTML) content from the child web page, a computer-implemented process for cross-domain communication between the parent web page and the child web page, comprising process actions of:

upon downloading the parent web page into the web browser, constructing an inter-frame messaging (IFM)-frame object within the parent web page, wherein the IFM-frame object comprises a parent instantiation of a channel-control object;

upon downloading the child web page into the web browser, constructing an IFM-channel object within the web browser, wherein the IFM-channel object comprises a child instantiation of the channel-control object;

establishing an IFM-channel connection between the parent instantiation of the channel-control object and the child instantiation of the channel-control object; and using the established IFM-channel connection to bidirectionally communicate text-based messages directly between the parent web page and the child web page, wherein said messages comprise commands and HTML content, and the cross-domain communication takes place completely within the web browser.

2. The process of claim 1, wherein the process action of constructing an IFM-frame object within the parent web page comprises actions of:

constructing an iframe which hosts the child web page;

making the iframe a child of the IFM-frame object;

setting the width and height of the iframe equal to the width and height of the IFM-frame object; and generating an identity (ID) for the IFM-channel connection between the parent web page and the child web page which is unique within the parent domain.

3. The process of claim 2, wherein the process action of using the established IFM-channel connection to bidirectionally communicate text-based messages directly between the parent web page and the child web page comprises an action of using the child instantiation of the channel-control object to download HTML content from the child web page over the established IFM-channel connection to the parent instantiation of the channel-control object for rendering and display in the iframe.

4. The process of claim 1, wherein the child instantiation of the channel control object comprises an allowed-domains parameter which specifies parent domains that are sanctioned by the child web page.

5. The process of claim 4, wherein the allowed-domains parameter specifies a select set of parent domains.

6. The process of claim 4, wherein the allowed-domains parameter specifies that no parent domains are sanctioned.

7. The process of claim 4, wherein the allowed-domains parameter specifies that all possible parent domains are sanctioned.

8. The process of claim 4, wherein the process action of establishing an IFM-channel connection between the parent instantiation of the channel-control object and the child instantiation of the channel-control object comprises actions of:

using the parent instantiation of the channel-control object to send a request message to the child instantiation of the channel-control object requesting to establish the IFM-channel connection there-between; and using the child instantiation of the channel-control object to, receive the request message, compare the parent domain that the request message originated from against the allowed-domains parameter, whenever the allowed-domains parameter specifies that the request message originated from a sanctioned parent domain, accept the request and establish the IFM-channel connection to the parent instantiation of the channel-control object that sent the request message, and whenever the allowed-domains parameter specifies that the request message originated from an unsanctioned parent domain, reject the request and prevent the IFM-channel connection from being established to the parent instantiation of the channel-control object that sent the request message.

9. The process of claim 8, wherein the process action of establishing an IFM-channel connection between the parent instantiation of the channel-control object and the child instantiation of the channel-control object further comprises an action of using the established IFM-channel connection to exchange a unique pair of cryptographically strong random numbers between the parent web page and the child web page, wherein said pair of numbers are employed as IFM-session keys to enhance the security of the IFM-channel connection.

10. The process of claim 9, wherein a central random number generating web service is employed to supply the random numbers to the parent web page and the child web page.

11. The process of claim 1, wherein the channel-control object comprises an Adobe Flash LocalConnection object.

12. The process of claim 1, wherein the IFM-frame object and IFM-channel object comprise a transport-speed parameter which specifies the throughput of the established IFM-channel connection, and whenever a slow throughput is specified by the transport-speed parameter, the process action of using the established IFM-channel connection to bidirectionally communicate text-based messages directly between the parent web page and the child web page comprises actions of:
whenever a text-based message which is larger than a prescribed size is to be transmitted across the established IFM-channel connection, using the channel-control object to chunk said message into a series of smaller messages before they are transmitted; and
whenever a chunked series of smaller messages is received from the established IFM-channel connection, using the channel-control object to reassemble the chunked series of smaller messages.

13. The process of claim 1, wherein the IFM-frame object and IFM-channel object are constructed using either a declarative markup style or a functional object constructor.

14. The process of claim 1, wherein the IFM-frame object, IFM-channel object and channel-control object are constructed using a single script file.

15. In a system comprising a parent web page which is hosted on a website server residing in a parent domain, a child web page which is hosted on another website server residing in a different child domain, and a client computing device comprising a web browser, wherein the parent web page embeds extensible markup language (XML) content from the child web page, a computer-implemented process for cross-domain communication between the parent web page and the child web page, comprising process actions of:
upon downloading the parent web page into the web browser, constructing an inter-frame messaging (IFM) frame object within the parent web page, wherein the IFM-frame object comprises an IFM-extensible markup language hypertext transfer protocol (XMLHTTP) request object;
upon downloading the child web page into the web browser, constructing an IFM-channel object within the web browser, wherein the IFM-channel object comprises an IFM-XMLHTTP-proxy object; and
using an XML-channel connection between the IFM-XMLHTTP-request object and the IFM-XMLHTTP-proxy object to bidirectionally communicate text-based messages directly between the parent web page and the child web page, wherein said messages comprise hypertext transfer protocol (HTTP) commands and XML content, and the cross-domain communication takes place completely within the web browser.

16. The process of claim 15, wherein the process action of constructing an IFM-frame object within the parent web page comprises actions of:
constructing an iframe which hosts the child web page;
making the iframe a child of the IFM-frame object; and
setting the width and height of the iframe equal to the width and height of the IFM-frame object.

17. The process of claim 16, wherein the IFM-XMLHTTP-proxy object comprises an allowed-domains parameter which specifies parent domains that are sanctioned by the child web page.

18. The process of claim 17, wherein the process action of using an XML-channel connection between the IFM-XMLHTTP-request object and the IFM-XMLHTTP-proxy object to bidirectionally communicate text-based messages directly between the parent web page and the child web page comprises actions of:
using the IFM-XMLHTTP-request object to send an IFM-XMLHTTP-request message to the IFM-XMLHTTP-proxy object, wherein the request message requests XML content from the child web page; and
using the IFM-XMLHTTP-proxy object to,
receive the request message,
compare the parent domain that the request message originated from against the allowed-domains parameter,
whenever the allowed-domains parameter specifies that the request message originated from an unsanctioned parent domain, block the request message to prevent the parent web page from accessing the child web page, and
whenever the allowed-domains parameter specifies that the request message originated from a sanctioned parent domain,
pass the request message to the website server which hosts the child web page, and
receive a response message from said website server comprising the requested XML content from the child web page and pass said received XML content to the web browser for rendering and display in the iframe.

19. The process of claim 18, wherein the IFM-XMLHTTP-request message comprises:
a content-type HTTP header which specifies a content-type associated with said message, wherein said content-type comprises either plain format XML content or Atom format XML content;
an authentication HTTP header comprising a declaration token which is used to authenticate the request message;
an HTTP verb;
a uniform resource locator path; and
a text-based message body comprising XML content to be sent to the particular child web page.

20. In a system comprising a parent web page which is hosted in a parent domain, a child web page which is hosted in a different child domain, and a client computing device comprising a web browser, wherein the parent web page embeds hypertext markup language (HTML) content from the child web page, a computer-implemented process for cross-domain communication between the parent web page and the child web page, comprising process actions of:
upon downloading the parent web page into the web browser,
constructing an inter-frame messaging (IFM) frame object within the parent web page, wherein the IFM-frame object comprises a parent instantiation of an Adobe Flash LocalConnection object, constructing an iframe which hosts the child web page, making the iframe a child of the IFM-frame object, setting the width and height of the iframe equal to the width and height of the IFM-frame object, and generating an identity (ID) for an IFM-channel connection between the parent web page and the child web page which is unique within the parent domain;

upon downloading the child web page into the web browser, constructing an IFM-channel object within the web browser, wherein the IFM-channel object comprises a child instantiation of the LocalConnection object, said instantiation comprising an allowed-domains parameter which specifies parent domains that are sanctioned by the child web page;

using the parent instantiation of the LocalConnection object to send a request message to the child instantiation of the LocalConnection object requesting to establish the IFM-channel connection there-between;

using the child instantiation of the LocalConnection object to, receive the request message and compare the parent domain that the request message originated from against the allowed-domains parameter, whenever the allowed-domains parameter specifies that the request message originated from a sanctioned parent domain, accept the request and establish the IFM-channel connection to the parent instantiation of the LocalConnection object that sent the request message, and whenever the allowed-domains parameter specifies that the request message originated from an unsanctioned parent domain, reject the request and prevent the IFM-channel connection from being established to the parent instantiation of the LocalConnection object that sent the request message; and using the established IFM-channel connection to bidirectionally communicate text-based messages directly between the parent web page and the child web page, wherein, said messages comprise commands, HTML content, and a unique pair of cryptographically strong random numbers which are exchanged between the parent web page and the child web page, wherein said pair of numbers are employed as IFM-session keys to enhance the security of the IFM-channel connection, and the cross-domain communication takes place completely within the web browser.

* * * * *